United States Patent
Yoon et al.

(10) Patent No.: US 9,236,619 B2
(45) Date of Patent: Jan. 12, 2016

(54) SOLID OXIDE FUEL CELL INCLUDING A COUPLING STRUCTURE

(75) Inventors: Duk-Hyoung Yoon, Yongin-si (KR); Shunsuke Taniguchi, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 849 days.

(21) Appl. No.: 13/064,433

(22) Filed: Mar. 24, 2011

(65) Prior Publication Data
US 2012/0040267 A1 Feb. 16, 2012

(30) Foreign Application Priority Data
Aug. 10, 2010 (KR) .................. 10-2010-0077033

(51) Int. Cl.
| H01M 8/24 | (2006.01) |
| H01M 8/04 | (2006.01) |
| H01M 8/02 | (2006.01) |
| H01M 8/00 | (2006.01) |
| H01M 8/12 | (2006.01) |
| H01M 8/10 | (2006.01) |

(52) U.S. Cl.
CPC ............ *H01M 8/004* (2013.01); *H01M 8/0206* (2013.01); *H01M 8/0215* (2013.01); *H01M 8/0228* (2013.01); *H01M 8/0236* (2013.01); *H01M 8/0245* (2013.01); *H01M 8/0247* (2013.01); *H01M 8/0252* (2013.01); *H01M 8/10* (2013.01); *H01M 8/12* (2013.01); *H01M 8/124* (2013.01); *H01M 2008/1293* (2013.01); *Y02E 60/50* (2013.01); *Y02E 60/525* (2013.01)

(58) Field of Classification Search
None
See application file for complete search history.

(56) References Cited

U.S. PATENT DOCUMENTS

| 6,998,187 | B2 | 2/2006 | Finnerty et al. | |
| 7,498,095 | B2 | 3/2009 | Finnerty et al. | |
| 2007/0141447 | A1 | 6/2007 | Crumm et al. | |
| 2009/0081516 | A1* | 3/2009 | Watanabe et al. | 429/31 |
| 2010/0040934 | A1* | 2/2010 | Perry et al. | 429/34 |
| 2010/0255398 | A1* | 10/2010 | Jacobson et al. | 429/452 |
| 2011/0059383 | A1 | 3/2011 | Taniguchi | |
| 2011/0065019 | A1 | 3/2011 | Taniguchi | |

FOREIGN PATENT DOCUMENTS

| KR | 10-2006-0054432 A | 5/2006 |
| KR | 10 2009-0029381 A | 3/2009 |

* cited by examiner

*Primary Examiner* — Alix Eggerding
(74) *Attorney, Agent, or Firm* — Lee & Morse, P.C.

(57) ABSTRACT

A solid oxide fuel cell having a coupling structure, the solid oxide fuel cell including a plurality of cells, each cell having a cell cap at an end thereof; and the coupling structure, the coupling structure connecting the plurality of cells, wherein the coupling structure includes a connector, the connector including an insulating portion at a center thereof, and coupling portions adjacent to the insulating portion at respective sides of the insulating portion and coupled to the cell caps.

31 Claims, 6 Drawing Sheets

SOLID OXIDE FUEL CELL INCLUDING A COUPLING STRUCTURE

BACKGROUND

1. Field

Embodiments relate to a solid oxide fuel cell including a coupling structure.

2. Description of the Related Art

A solid oxide fuel cell may be used in consideration of its capacity. In the solid oxide fuel cell, one unit cell may be formed by connecting a plurality of sub-cells; and a bundle or stack may be manufactured by connecting a plurality of such unit cells. Accordingly, a connection structure between unit cells may be an important factor considered in the solid oxide fuel cell.

SUMMARY

Embodiments are directed to a solid oxide fuel cell including a coupling structure.

At least one of the above and other features and advantages may be realized by providing a solid oxide fuel cell having a coupling structure, the solid oxide fuel cell including a plurality of cells, each cell having a cell cap at an end thereof; and the coupling structure, the coupling structure connecting the plurality of cells, wherein the coupling structure includes a connector, the connector including an insulating portion at a center thereof, and coupling portions adjacent to the insulating portion at respective sides of the insulating portion and coupled to the cell caps.

The insulating portion may be formed of ceramic.

The connector may have a hollow shape, and the coupling portion may include one or more metal layers.

Each coupling portion may include a plurality of the metal layers, the plurality of the metal layers including at least one first metal layer and at least one second metal layer, and the first and second metal layers may be coupled to each other.

The first metal layer may include a first metal, the second metal layer may include a second metal, and the first metal may have a thermal expansion coefficient different from a thermal expansion coefficient of the second metal.

The first metal layer of each of the coupling portions may be coupled to a side of the insulating portion, the first metal layers being configured to compensate for a change in volume due to the difference of the thermal expansion coefficients between the first and second metal layers.

The second metal layer may be joined with the cell cap through brazing.

The first metal layer may include any one of a nickel-cobalt ferrous ally, a nickel steel alloy, and a nickel-chromium based superalloy, and the second metal layer includes stainless steel.

The one or more metal layers may be integrally formed with the insulating portion.

The one or more metal layers may include a high temperature alloy.

The high temperature alloy may include any one of a nickel-cobalt ferrous alloy, a nickel steel alloy, and a nickel-chromium based superalloy.

The one or more metal layers may include stainless steel.

The coupling portion may include a flange portion.

The one or more metal layers may include a first metal layer coupled to the insulating portion and a second metal layer coupled to the first metal layer, and the flange portion may be on an outer circumference of the second metal layer.

The flange portion may include a flange plate and one or more gasket grooves, the gasket grooves extending circumferentially on a surface of the flange plate.

The flange plate may include fastening holes.

The cell cap may further include a cell cap flange portion on the connector joining portion.

The cell cap flange portion may include one or more gasket grooves extending circumferentially along a surface thereof.

The cell cap flange portion may include a plurality of fastening holes therein.

The connector may include a fluid communication hole in an interior thereof, the fluid communication hole being in communication with an interior of the cell.

The cell cap may include a cell fastening portion fastened to an end of the cell and a connector joining portion joined with the connector.

The cell cap may include a fluid communication hole in an interior thereof, the fluid communication hole being in communication with an interior of the cell.

At least one of the above and other features and advantages may also be realized by providing a solid oxide fuel cell having a coupling structure, the solid oxide fuel cell including a plurality of cells, each cell having a cell cap at an end thereof; a connector, the connector including an insulating portion formed of ceramic at a center thereof, and one or more metal layers adjacent to the insulating portion at respective sides of the insulating portion and connected to the cell caps, the connector being a coupling structure in which the one or more metal layers and the cell cap are fastened to each other; and one or more gaskets between the connector and the cell cap.

The cell cap may include a cell cap flange portion and the one or more metal layers of the connector may include a flange portion.

The one or more metal layers may include a first metal layer coupled to the insulating portion and a second metal layer coupled to the first metal layer; the first metal layer may include a first metal, the second metal layer may include a second metal, and the first metal may have a thermal expansion coefficient different from a thermal expansion coefficient of the second metal; and the first metal layer may be configured to compensate for a change in volume due to the difference of the thermal expansion coefficients between the first and second metal layers.

The first metal layer may include any one of a nickel-cobalt ferrous ally, a nickel steel alloy, and a nickel-chromium based superalloy, and the second metal layer may include stainless steel.

The gasket may be interposed between the cell cap flange portion and the flange portion of the connector.

The cell cap flange portion and the flange portion of the connector may respectively include gasket grooves circumferentially formed on surfaces thereof.

The gasket may include a gasket projection corresponding to the gasket groove of the cell cap flange portion or the flange portion of the connector.

The gasket may include a through-hole at a center thereof.

An outer edge of each of the cell cap flange portion, the flange portion of the connector, and the gasket may include a plurality of fastening holes.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1A:
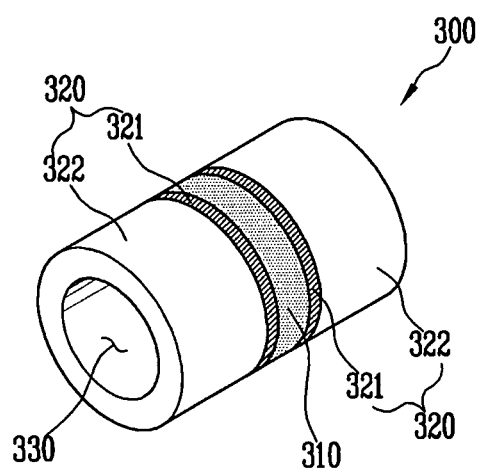
FIG. 1A illustrates a schematic perspective view of a connector according to an embodiment.

Korean Patent Application No. 10-2010-0077033, filed on Aug. 10, 2010, in the Korean Intellectual Property Office, and entitled: "Solid Oxide Fuel Cell Including Coupling Structure" is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another element, it can be directly on the other element, or intervening elements may also be present. In addition, it will also be understood that when an element is referred to as being "between" two element, it can be the only element between the two elements, or one or more intervening elements may also be present. Like reference numerals refer to like elements throughout.

Also, when an element is referred to as being "connected to" or "coupled to" another element, it can be directly connected or coupled to the another element or be indirectly connected or coupled to the another element with one or more intervening elements interposed therebetween.

Figure 1B:
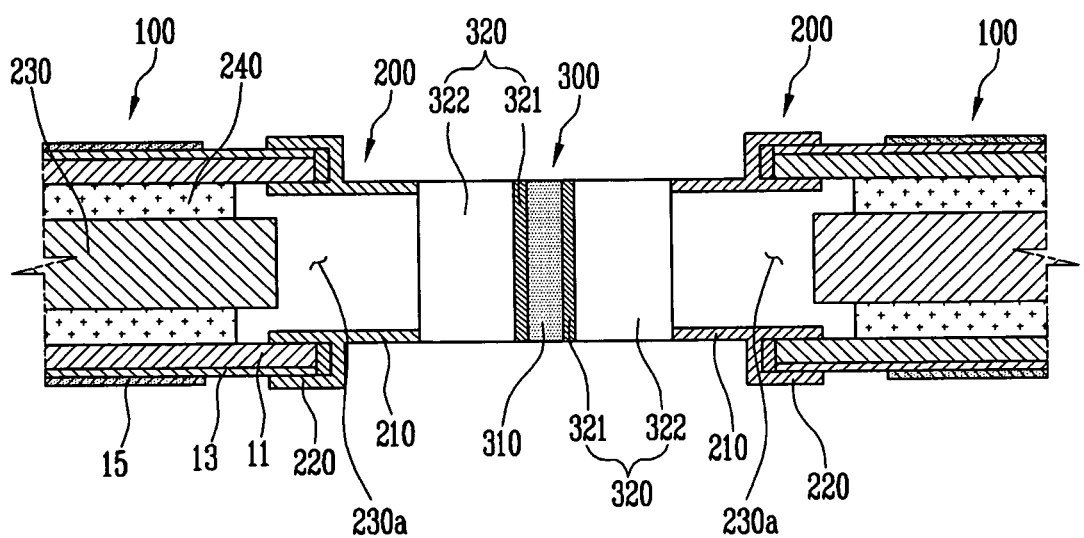
FIG. 1B illustrates a sectional view of a coupling structure using the connector of FIG. 1A.

FIG. 1A illustrates a schematic perspective view of a connector according to an embodiment. FIG. 1B illustrates a sectional view of a coupling structure using the connector of FIG. 1A.

In the present embodiment, each cell 100 may include a first electrode 11 that is an anode, a second electrode 15 that is a cathode, and an electrolyte layer 13 interposed therebetween. A separate cell cap 200 may be provided at one end of each of the cells 100. The cell caps 200 may be fastened to ends of the respective cells 100; and each of the cell caps 200 may include a cell fastening portion 220 fastened to the end of the cell 100 and a connector joining portion 210 joined with a side of the connector 300. The connector joining portion 210 and the cell fastening portion 220 may be integrally formed; and a fluid communication hole 230a through which a fluid may flow may be formed in an interior of the cell cap 200. The cell fastening portion 220 may include an accommodating groove in which ends of the first electrode 11 and the electrolyte layer 13 are accommodated. The cell 100 according to the present embodiment may include an additional support bar 230 that passes through an interior thereof as well as a current collection structure 240 on an inner circumferential surface of the first electrode 11.

The cells 100 may be connected to each other using a coupling structure. In FIG. 1A, the connector 300 is schematically shown as a coupling structure. The connector 300 may couple the cells 100 to each other through the cell caps 200 at ends of the cells 100. For example, the cell cap 200 may be coupled to the cell 100 in a state in which it may electrically communicate with the cell 100 and may be coupled to the first or second electrode 11 or 13 of the cell 100. The cell caps 200 may be joined with each other through the connector 300 using, e.g., brazing.

The connector 300 shown in FIG. 1A may be have a hollow shape and may have an insulating portion 310 formed of, e.g., ceramic, at a center portion thereof. Metal layers 320 may be formed at sides of the insulating portion 310 as connection portions connected to respective cell caps 200. The metal layer 320 may include a first metal layer 321 contacting the insulating portion 310 at a left and/or right of the insulating portion 310 and a second metal layer 322 adjacent to the first metal layer 321. For example, the first metal layer 321 may be between the insulating portion 310 and the second metal layer 322. The connector 300 may include a fluid communication hole 330 in an interior thereof. For example, a fluid may flow through the hollow fluid communication hole 330. Thus, the connector 300 may facilitate flow of the fluid in the interior thereof, but current flow may be blocked by the insulating portion 310. The first and second metal layers 321 and 322 at the sides of the insulating portion 310 may be formed from metals having different thermal expansion coefficients from each other. Thus, a difference between changes in volumes, which may occur at a high temperature due to the difference between the thermal expansion coefficients, may be compensated for. The first metal layer 321 may include a special alloy, e.g., a nickel-cobalt ferrous alloy (e.g., Kovar from Carpenter Technology Corporation), a nickel-steel alloy (e.g., Invar from ArcelorMittal), or an austenitic nickel-chromium based superalloy (e.g., Inconel from Special Metals Corporation), which may exhibit excellent thermal expansion properties as a high temperature alloy. Kovar is an alloy including, e.g., Fe, Ni, Co, or the like, and may be suitable for a thermal expansion property of, e.g., ceramic and glass. Invar is frequently used for, e.g., precision instruments, optical instruments, and the like, and is an Fe—Ni alloy as a material of whose dimensions are hardly changed with respect to a change in temperature. Inconel is an alloy including, e.g., Ni, Cr, Fe, Ti, Al, or the like, and may be used for high-temperature heat-resistant equipment. The second metal layer 322 may include, e.g., stainless steel.

Figure 2A:
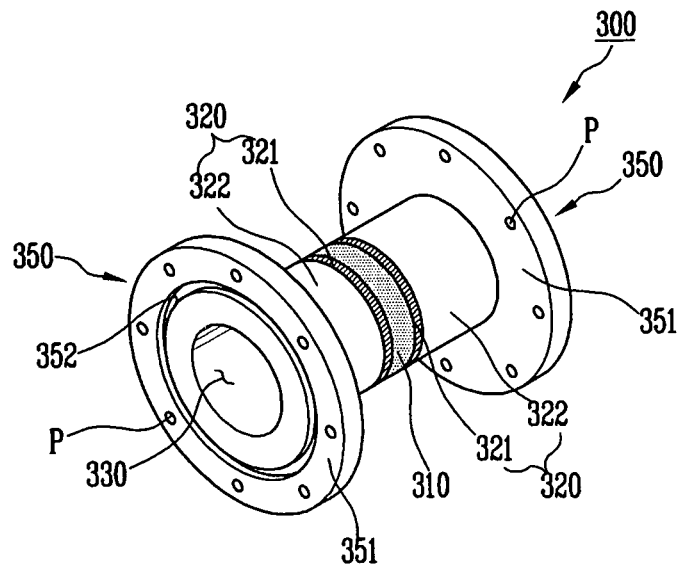
FIG. 2A illustrates a schematic perspective view of a connector according to another embodiment.
Figure 2B:
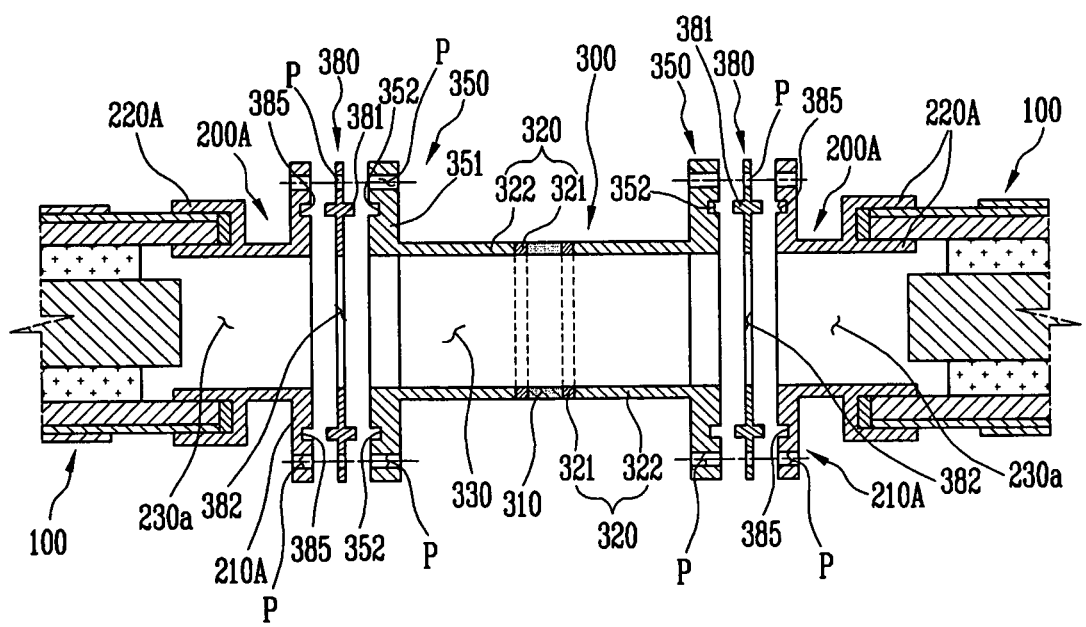
FIG. 2B illustrates a sectional view of a coupling structure using the connector of FIG. 2A.

FIG. 2A illustrates a schematic perspective view of a connector according to another embodiment. FIG. 2B illustrates a sectional view of a coupling structure using the connector of FIG. 2A.

The connector 300 shown in FIG. 2A may have a hollow cylindrical shape and may include an insulating portion 310 made of, e.g., ceramic or the like, at a center portion thereof as well as metal layers 320 respectively formed adjacent to the insulating portion 310 at sides thereof. The metal layer 320 may include a first metal layer 321 and a second metal layer 322 as described above. The connector 300, which will be described in further detail below, may be formed in various shapes, e.g., a flat tube, an ellipse, and the like. Hereinafter, a cylindrical connector 300, cylindrical cells 100, and cell caps 200 will be described.

The insulating portion 310 may be formed of, e.g., ceramic, and the first and second metal layers 321 and 322 may be formed from metals having different thermal expansion coefficients from each other. As described above, the first metal layer 321 may include a special alloy, e.g., a nickel-cobalt ferrous alloy (e.g., Kovar from Carpenter Technology Corporation), a nickel-steel alloy (e.g., Invar from ArcelorMittal), or an austenitic nickel-chromium based superalloy (e.g., Inconel from Special Metals Corporation), which may exhibit excellent thermal expansion properties as a high temperature alloy. The second metal layer may include, e.g., stainless steel. The connector 300 may include a fluid communication hole 330 passing through an interior thereof. Thus, if the cells 100 are connected through the connector 300 of the present embodiment, movement of current or electrons may be prevented by the insulating layer 310, but fuel or water that flows into both electrode terminals may pass through the fluid communication hole 330 in the interior of the connector 300.

The connector 300 will now be described in detail. The connector 300 may include the metal layer 320 and the insulating portion 310. The metal layer 320 may include the first and second metal layers 321 and 322. An end portion of the second metal layer 322 may be sealed to and may communicate with the cell cap 200 of the cell 100 so that the cells 100 may be firmly coupled to each other. The insulating portion 310 may include a layer for blocking or interrupting current. The second metal layer 322 outside of the insulating portion 310 may be fastened to the cell cap 200. Thus, the insulating portion 310 and the second metal layer 322 may have different physical and chemical characteristics. For example, a temperature of the cell may reach up to about 800° C. Thus, thermal expansion according to a change in temperature may be significant. For example, if the insulating portion 310 and the second metal layer 322 have greatly different thermal expansion coefficients from each other, it may be difficult to maintain the firmly coupled state. Therefore, in the present embodiment, the first metal layer 321 may be separately formed to connect between the ceramic insulating portion 310 and the second metal layer 322. As described above, first metal layer 321 may include a special alloy, e.g., a nickel-cobalt ferrous alloy (e.g., Kovar from Carpenter Technology Corporation), a nickel-steel alloy (e.g., Invar from ArcelorMittal), or an austenitic nickel-chromium based superalloy (e.g., Inconel from Special Metals Corporation), a dimension of which may hardly change with respect to a change in temperature.

The connector 300 according to the present embodiment may include a flange portion 350 at an outside or end of the second metal layer 322. The flange portion 350 may correspond to a cap flange portion 210A of a cell cap 200A. For example, as shown FIGS. 2A and 2B, the connector 300 according to the present embodiment may include the flange portion 350 that enlarges an edge portion of the connector 300 at an end of the second metal layer 322. The flange portion 350 may facilitate fastening between the connector 300 and the cell cap 200A, rather than the fastening through, e.g., brazing, described in the previous embodiment. Each of the flange portions 350 at sides of the connector 300 may include a flange plate 351 extended to an outer circumference of the connector 300. The flange plate 351 may include a concave gasket groove 352 spaced radially from the fluid communication hole 330 along a circumference of the flange plate 351. The gasket groove 352 may have a diameter greater than that of the fluid communication hole 330. The gasket groove 352 may facilitate insertion of a gasket 380 thereinto. For example, the gasket 380 may seal a connection portion between the connector 300 and the cell cap 200A so that fluid or fuel may not leak through the connection portion when the connector 300 and the cell cap 200A are coupled to each other. In an implementation, a plurality of fastening holes P may be formed along a circumferential direction in the flange plate 351.

Figure 3:
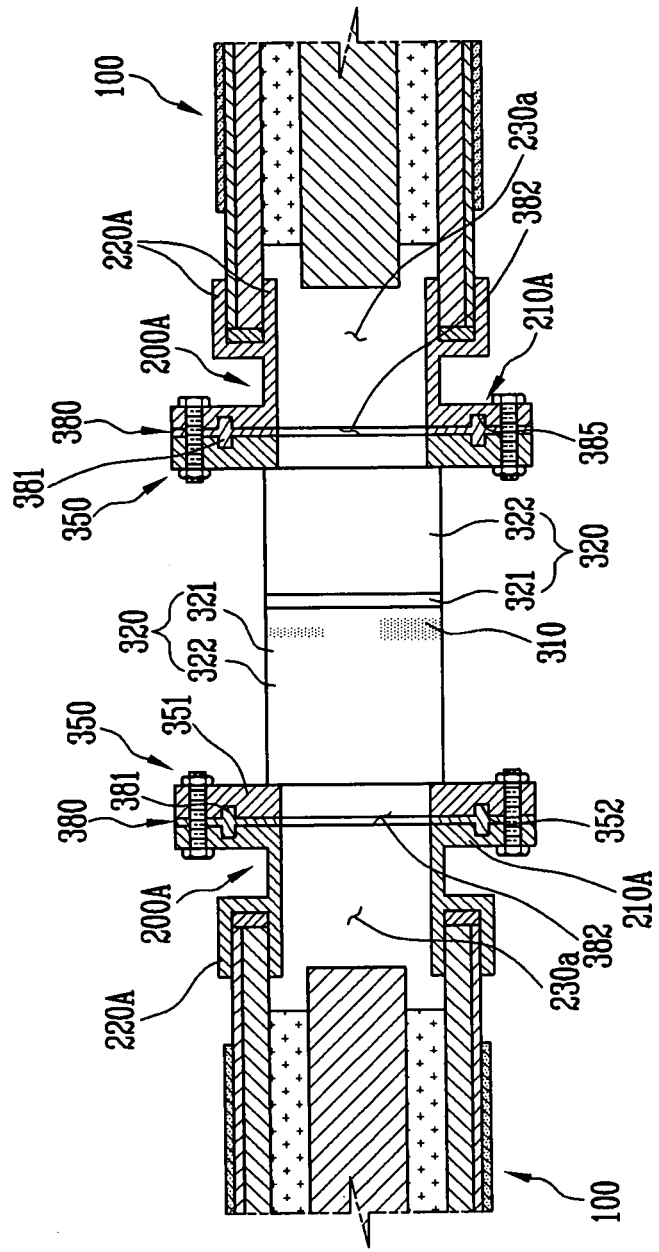
FIG. 3 illustrates a sectional view showing a structure of cells connected through a connector according to another embodiment.
Figure 4:
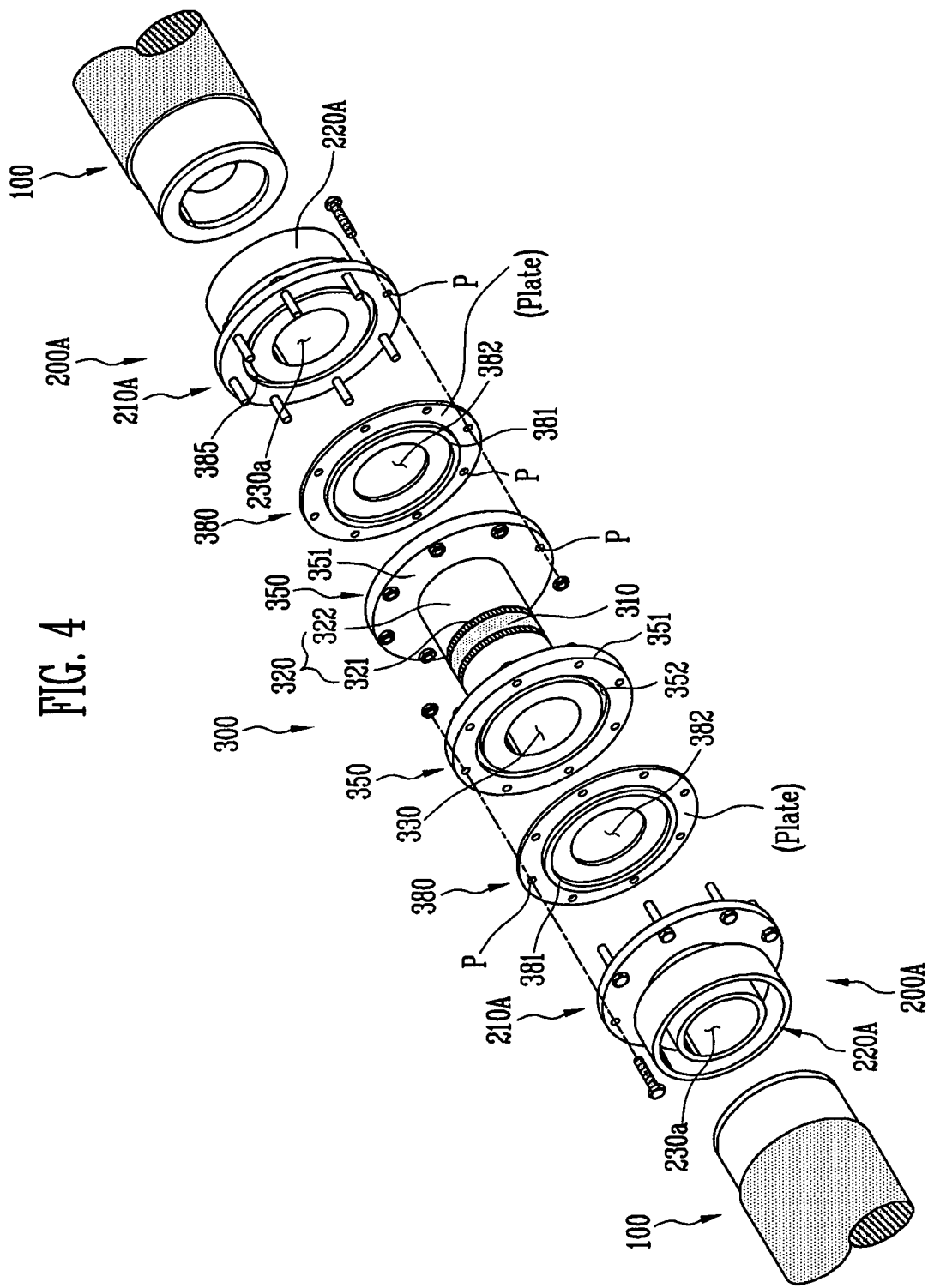
FIG. 4 illustrates an exploded perspective view showing the structure of cells connected to each other through a connector having a flange portion according to yet another embodiment.

FIG. 3 illustrates a sectional view showing a structure of cells connected through a connector according to another embodiment. FIG. 4 illustrates an exploded perspective view showing the structure of cells connected to each other through a connector having a flange portion according to yet another embodiment.

In the present embodiment, the gasket 380 may be inserted into the gasket groove 352 of the flange portion 350 of the connector 300 to prevent gas or other fluid from leaking between the cell cap flange portion 210A and the connector 300. For example, the cell cap 200A may be provided at ends of each of the cells 100. The cell cap 200A may include a cell cap flange portion 210A as a connector joining portion joined with a corresponding connector 300 and a cell fastening portion 220A fastened to each of the cells 100. The cell cap flange portion 210A and the cell fastening portion 220A may be integrally formed; and a fluid communication hole 230a through which fluid may flow may be formed in the interior of cell cap 200A.

The gasket 380 may include a plate made of a metal material in which a gasket projection 381 having a shape corresponding to the gasket groove 352 of the flange portion 350 may protrude from the surface of the gasket 380. The gasket 380 may include a through-hole 382 in communication with the fluid communication hole 330 of the connector 300 at a center portion of the gasket 380.

Figure 5A:
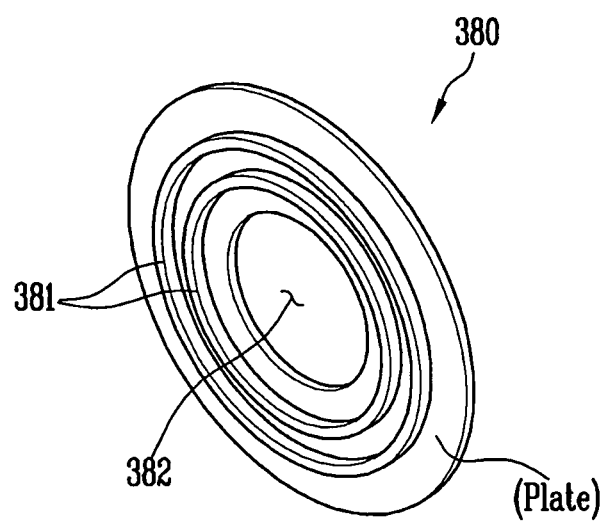
FIGS. 5A and 5B illustrate perspective views of examples of a gasket.
Figure 5B:
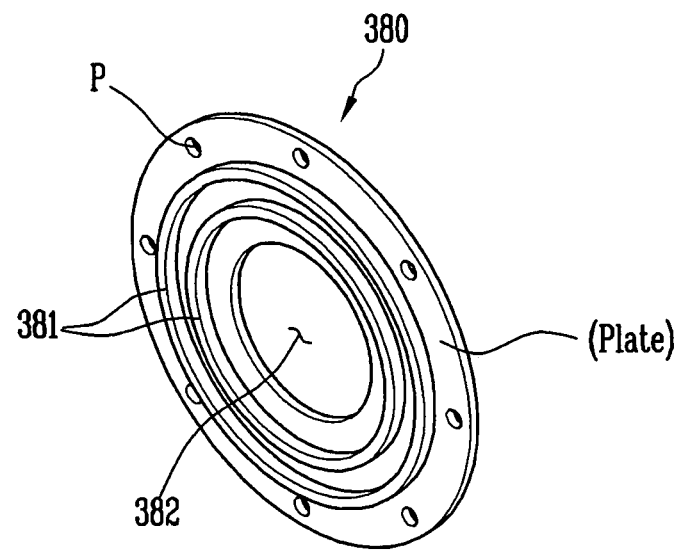

FIGS. 5A and 5B illustrate perspective views of examples of a gasket. As shown in FIGS. 5A and 5B, in the gaskets 380, the gasket projection 381 may protrude from a front of a metal disk plate along a corresponding gasket groove 352 of the flange portion 350 of the connector 300. Thus, the gasket projection 381 may be inserted into the gasket groove 352 when the plate of the gasket 380 comes in surface contact with the flange portion 350 so that the gasket 380 and the flange portion 350 may be firmly coupled to each other. Sealing may be secured through the coupling between the gasket 380 and the flange portion 350 so that leakage of water, fuel, or other fluid passing through the fluid communication hole 330 and the through-hole 382 may be prevented. The plate that constitutes the gasket 380 may be made of a metal material. The gasket projection 381 of the gasket 380 may include a plurality of gasket projections 381 to correspond to gasket grooves 352 of the flange plate 351. In an implementation, as illustrated in FIG. 5A, the gasket 380 may not include a fastening hole P.

As illustrated in FIGS. 2 to 4, one gasket projection 381 may be formed on the plate of the gasket 380. As illustrated in FIGS. 5A and 5B, two gasket projections 381 may be formed on the plate of the gasket 380. For example, the gasket 380 having no fastening hole P therein is shown in FIG. 5A and the gasket 380 having a plurality of fastening holes P therein is shown in FIG. 5B. Here, the gasket 380 may be fastened together with the connector 300 and the cell cap 200A by inserting a fastener, e.g., a bolt, into the fastening hole P.

The gasket 380 may be coupled to the connector 300 having the flange portion 350. The cell cap flange portion 210A may be formed on the cell cap 200A and may be coupled to the connector 300 with the gasket 380 therebetween.

As described with respect to FIGS. 2 to 5, the cell cap flange portion 210A may be fastened to the connector 300; and a shape and size of an edge of the cell cap flange portion 210A may be identical or similar to those of the corresponding flange portion 350 of the connector 300. Thus, the cell cap flange portion 210A and the flange portion 350 may be in close contact so that the fluid communication holes 230a and 330 through which the fluid may flow may be aligned in the interiors of the connector 300 and the cell cap 200A.

Figure 6:
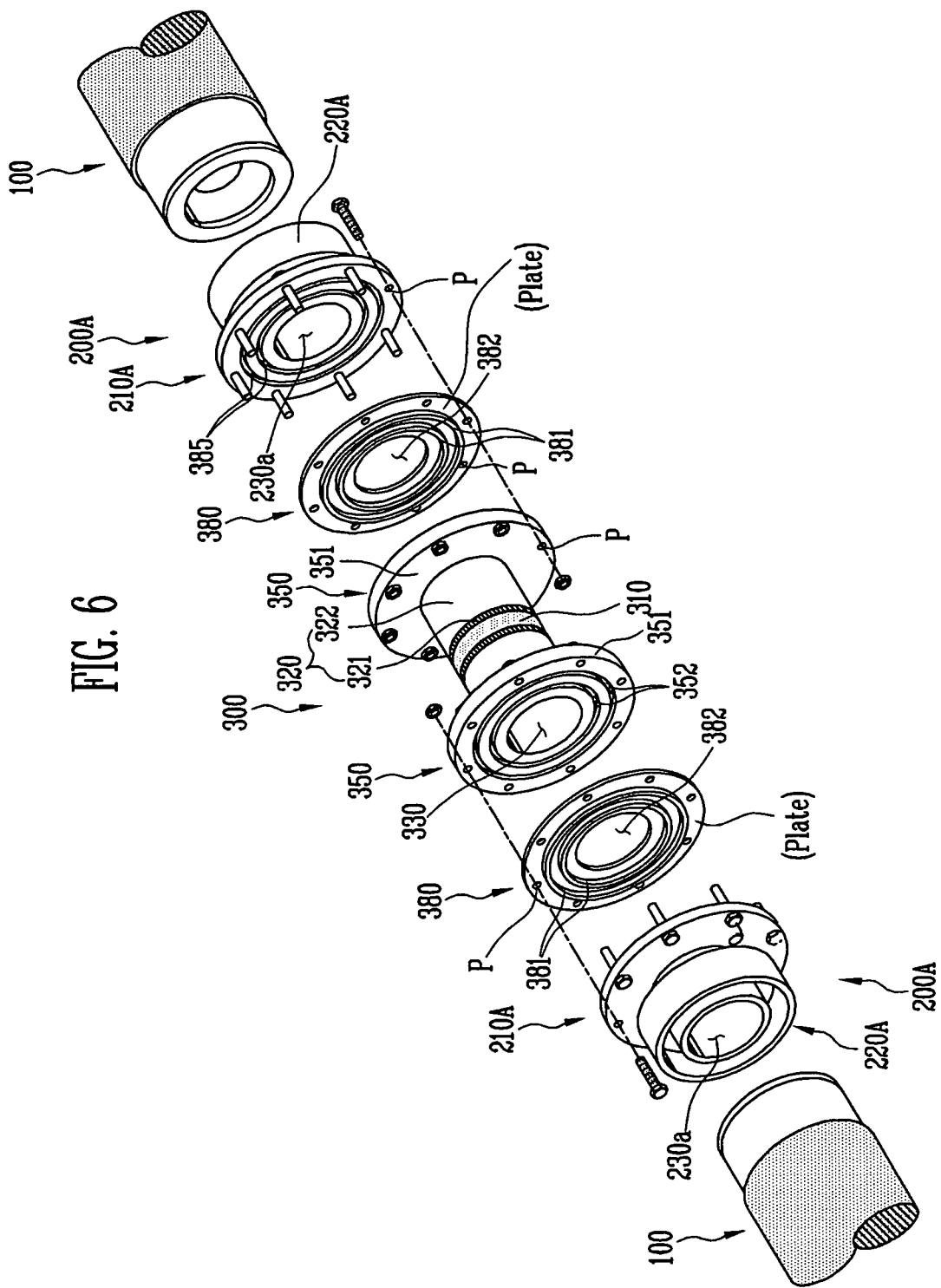
FIG. 6 illustrates an exploded perspective view of a structure of cells connected through a connector according to still another embodiment.

FIG. 6 illustrates an exploded perspective view of a structure of cells connected through a connector according to still another embodiment. For example, FIG. 6 illustrates an exploded perspective view showing a plurality of gaskets. In the present embodiment, two gasket grooves 352, two gasket projections 381, and two gasket groove 385 may be formed as shown in FIG. 6. A plurality of fastening holes P may be formed in the flange portion 350 and the gasket 380 and may correspond to the cell cap flange portion 210A so that they may be firmly fastened with fasteners, e.g., bolts. In an implementation, the fastener may include, e.g., a rivet, a screw, and other fasteners. In an implementation, the flange portion 350 and the cell cap flange portion 210A may be more firmly joined by using an additional brazing technique after fastening is completed.

In an implementation, even in the case of a solid oxide fuel cell operated at a temperature of more than about 800° C. and a change in volume caused by the temperature, a more reliable connection structure between unit cells may be provided.

The embodiments provide a fuel cell in which cells may be coupled with each other using a coupling structure that may help ensure excellent insulating and sealing between the cells.

The embodiments provide a fuel cell in which a plurality of metal layers having different thermal expansion coefficients from each other are included in a connector, so that it is possible to compensate for a change in volume due to a difference between the thermal expansion coefficients.

As described above, according to embodiments, cells of a fuel cell may be simply coupled to each other through a connector so that the coupling between the cells may be easily performed.

In addition, the coupling together of the cells may be performed through the connector and cell caps so that it is possible to facilitate the flow of fluid between the cells and to insulate the cells through an insulating layer in the connector.

In addition, a change in volume due to a difference between thermal expansion coefficients may be compensated for even if the fuel cell is operated at a high temperature.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A solid oxide fuel cell having a coupling structure, the solid oxide fuel cell comprising:
   a plurality of cells, each cell having a cell cap at an end thereof, wherein each cell cap includes a cell fastening portion fastened to an end of the cell; and
   the coupling structure, the coupling structure connecting the plurality of cells,
   wherein the coupling structure includes a connector, the connector having a hollow shape and including:
   an insulating portion at a center thereof, and
   coupling portions adjacent to the insulating portion at respective sides of the insulating portion and coupled to the cell caps, each coupling portion including a plurality of metal layers, the plurality of metal layers including at least one first metal layer and at least one second metal layer, the first and second metal layers being coupled to each other.

2. The solid oxide fuel cell as claimed in claim 1, wherein the insulating portion is formed of ceramic.

3. The solid oxide fuel cell as claimed in claim 1, wherein the first metal layer includes a first metal, the second metal layer includes a second metal, and the first metal has a thermal expansion coefficient different from a thermal expansion coefficient of the second metal.

4. The solid oxide fuel cell as claimed in claim 3, wherein the first metal layer of each of the coupling portions is coupled to a side of the insulating portion, the first metal layers being configured to compensate for a change in volume due to the difference of the thermal expansion coefficients between the first and second metal layers.

5. The solid oxide fuel cell as claimed in claim 4, wherein the second metal layer is joined with the cell cap through brazing.

6. The solid oxide fuel cell as claimed in claim 4, wherein the first metal layer includes any one of a nickel-cobalt ferrous ally, a nickel steel alloy, and a nickel-chromium based superalloy, and the second metal layer includes stainless steel.

7. The solid oxide fuel cell as claimed in claim 1, wherein the plurality of metal layers are integrally formed with the insulating portion.

8. The solid oxide fuel cell as claimed in claim 1, wherein the plurality of metal layers include a high temperature alloy.

9. The solid oxide fuel cell as claimed in claim 8, wherein the high temperature alloy includes any one of a nickel-cobalt ferrous alloy, a nickel steel alloy, and a nickel-chromium based superalloy.

10. The solid oxide fuel cell as claimed in claim 1, wherein the plurality of metal layers include stainless steel.

11. The solid oxide fuel cell as claimed in claim 1, wherein each coupling portion includes a flange portion.

12. The solid oxide fuel cell as claimed in claim 11, wherein:
   the plurality of metal layers include a first metal layer coupled to the insulating portion and a second metal layer coupled to the first metal layer, and
   the flange portion is on an outer circumference of the second metal layer.

13. The solid oxide fuel cell as claimed in claim 12, wherein the flange portion includes a flange plate and one or more gasket grooves, the gasket grooves extending circumferentially on a surface of the flange plate.

14. The solid oxide fuel cell as claimed in claim 13, wherein the flange plate includes fastening holes.

15. The solid oxide fuel cell as claimed in claim 11, wherein the cell cap further includes a connector joining portion joined with the connector and a cell cap flange portion on the connector joining portion.

16. The solid oxide fuel cell as claimed in claim 15, wherein the cell cap flange portion includes one or more gasket grooves extending circumferentially along a surface thereof.

17. The solid oxide fuel cell as claimed in claim 16, wherein the cell cap flange portion includes a plurality of fastening holes therein.

18. The solid oxide fuel cell as claimed in claim 1, wherein the connector includes a fluid communication hole in an interior thereof, the fluid communication hole being in communication with an interior of the cell.

19. The solid oxide fuel cell as claimed in claim 1, wherein the cell cap includes a connector joining portion joined with the connector.

20. The solid oxide fuel cell as claimed in claim 1, wherein the cell cap includes a fluid communication hole in an interior thereof, the fluid communication hole being in communication with an interior of the cell.

21. The solid oxide fuel cell as claimed in claim 1, wherein each cell has a separate cell cap at an end thereof.

22. A solid oxide fuel cell having a coupling structure, the solid oxide fuel cell comprising:
   a plurality of cells, each cell having a cell cap at an end thereof, wherein each cell cap includes a cell fastening portion fastened to an end of the cell;
   a connector, the connector having a hollow shape and including:
   an insulating portion formed of ceramic at a center thereof, and
   a plurality of metal layers adjacent to the insulating portion at respective sides of the insulating portion and connected to the cell caps, the connector being a coupling structure in which the plurality of metal layers and the cell cap are fastened to each other, the plurality of metal layers including at least one first metal layer and at least one second metal layer, the first and second metal layers being coupled to each other; and
   one or more gaskets between the connector and the cell cap.

23. The solid oxide fuel cell as claimed in claim 22, wherein the cell cap includes a cell cap flange portion and the plurality of metal layers of the connector include a flange portion.

24. The solid oxide fuel cell as claimed in claim 23, wherein:
   the plurality of metal layers include a first metal layer coupled to the insulating portion and a second metal layer coupled to the first metal layer;
   the first metal layer includes a first metal, the second metal layer includes a second metal, and the first metal has a thermal expansion coefficient different from a thermal expansion coefficient of the second metal; and
   the first metal layer is configured to compensate for a change in volume due to the difference of the thermal expansion coefficients between the first and second metal layers.

25. The solid oxide fuel cell as claimed in claim 24, wherein the first metal layer includes any one of a nickel-cobalt ferrous ally, a nickel steel alloy, and a nickel-chromium based superalloy, and the second metal layer includes stainless steel.

26. The solid oxide fuel cell as claimed in claim 23, wherein the gasket is interposed between the cell cap flange portion and the flange portion of the connector.

27. The solid oxide fuel cell as claimed in claim 26, wherein the cell cap flange portion and the flange portion of the connector respectively include gasket grooves circumferentially formed on surfaces thereof.

28. The solid oxide fuel cell as claimed in claim 27, wherein the gasket includes a gasket projection corresponding to the gasket groove of the cell cap flange portion or the flange portion of the connector.

29. The solid oxide fuel cell as claimed in claim 26, wherein the gasket includes a through-hole at a center thereof.

30. The solid oxide fuel cell as claimed in claim 26, wherein an outer edge of each of the cell cap flange portion, the flange portion of the connector, and the gasket includes a plurality of fastening holes.

31. The solid oxide fuel cell as claimed in claim 22, wherein each cell has a separate cell cap at an end thereof.

* * * * *